(12) United States Patent
Kusch et al.

(10) Patent No.: US 8,378,623 B2
(45) Date of Patent: Feb. 19, 2013

(54) APPARATUS AND METHOD FOR CHARGING AN ELECTRIC VEHICLE

(75) Inventors: Ruediger Soeren Kusch, Clifton Park, NY (US); Robert Dean King, Schenectady, NY (US); Robert Louis Steigerwald, Burnt Hills, NY (US)

(73) Assignee: General Electric Company, Schenectady, NY (US)

( * ) Notice: Subject to any disclaimer, the term of this patent is extended or adjusted under 35 U.S.C. 154(b) by 343 days.

(21) Appl. No.: 12/940,085

(22) Filed: Nov. 5, 2010

(65) Prior Publication Data
US 2012/0112693 A1    May 10, 2012

(51) Int. Cl.
*H01M 10/44* (2006.01)
*H01M 10/46* (2006.01)

(52) U.S. Cl. ...................................................... 320/104

(58) Field of Classification Search .................. 320/104, 320/107, 127, 134, 135, 136, 138; 323/223, 323/267; 363/15, 67; 903/907
See application file for complete search history.

(56) References Cited

U.S. PATENT DOCUMENTS

| | | | |
|---|---|---|---|
| 5,373,195 A | 12/1994 | De Doncker et al. | |
| 5,589,743 A | 12/1996 | King | |
| 5,903,449 A | 5/1999 | Garrigan et al. | |
| 5,929,595 A | 7/1999 | Lyons et al. | |
| 6,331,365 B1 | 12/2001 | King | |
| 6,724,100 B1 | 4/2004 | Gabriel | |
| 6,737,822 B2 | 5/2004 | King | |
| 7,049,792 B2 | 5/2006 | King | |
| 7,427,450 B2 | 9/2008 | Raiser | |
| 7,517,298 B2 | 4/2009 | Ortmann | |
| 7,559,388 B2 | 7/2009 | Severinsky et al. | |
| 2008/0055940 A1* | 3/2008 | Lawson et al. | 363/16 |
| 2009/0242291 A1* | 10/2009 | Sagawa et al. | 180/65.265 |

OTHER PUBLICATIONS

Schutten et al., "Characteristics of Load Resonant Converters Operated in a High-Power Factor Mode," IEEE Transactions on Power Electronics, vol. 7, No. 2, Apr. 1992, pp. 304-314.

Balogh, "The Current-Doubler Rectifier: An Alternative Rectification Technique for Push-Pull and Bridge Converters," Unitrode Corporation, Merrimack, NH, Dec. 1994, pp. 1-4.

Mappus, "Current Doubler Rectifier Offers Ripple Current Cancellation," Abstract, Texas Instruments, Dallas, TX, Sep. 2004, pp. 1-8.

* cited by examiner

*Primary Examiner* — Edward Tso
(74) *Attorney, Agent, or Firm* — Ziolkowski Patent Solutions Group, SC; Jean K. Testa

(57) ABSTRACT

An energy management system (ESMS) includes energy storage devices coupled to a vehicle drivetrain and configured to store DC energy, a power electronic conversion system having energy ports, the power electronic conversion system comprising a DC electrical converters, each DC electrical converter configured to step up and to step down a DC voltage, wherein each of the energy ports is coupleable to each of the energy storage devices and each of the energy ports is coupleable to an electrical charging system. The EV includes a controller configured to determine a voltage of each energy port having either an energy storage device or a DC electrical charging system coupled thereto, and electrically connect a first energy port to a second energy port such that at least one of the DC electrical converters either steps up or steps down an input DC voltage based on the determined voltage of each energy port.

28 Claims, 13 Drawing Sheets

FIG. 3

CHARGER CONFIGURATIONS — 200

| | FUNCTION | PORT 1 | PORT 2 | PORT 3 | PORT4 |
|---|---|---|---|---|---|
| 1 | SINGLE BATTERY W/ INTEGRATED WIDE INPUT RANGE CHARGER | ENERGY BATTERY | U/C BANK | CHARGER INPUT (DC OR RECT. AC) | N.A. |
| 2 | DUAL BATTERY W/ INTEGRATED WIDE INPUT RANGE CHARGER | ENERGY BATTERY | POWER BATTERY | CHARGER INPUT (DC OR RECT. AC) | N.A. |
| 3 | TRIPLE BATTERY W/ INTEGRATED WIDE INPUT RANGE CHARGER | ENERGY BATTERY I | POWER BATTERY | CHARGER INPUT (DC OR RECT. AC) | ENERGY BATTERY II (ULTRACAP) |
| 4 | BOOST BATTERY W/ LOW VOLTAGE CHARGER | ENERGY BATTERY | POWER BATTERY | POWER BATTERY | CHARGER INPUT |
| 5 | DUAL BATTERY W/ INTEGRATED WIDE INPUT RANGE CHARGER AND INTERLEAVING IN NORMAL OPERATION | ENERGY BATTERY | POWER BATTERY | CHARGER INPUT (DC OR RECT. AC) | PARALLEL CONNECTED TO PORT 1 |

202

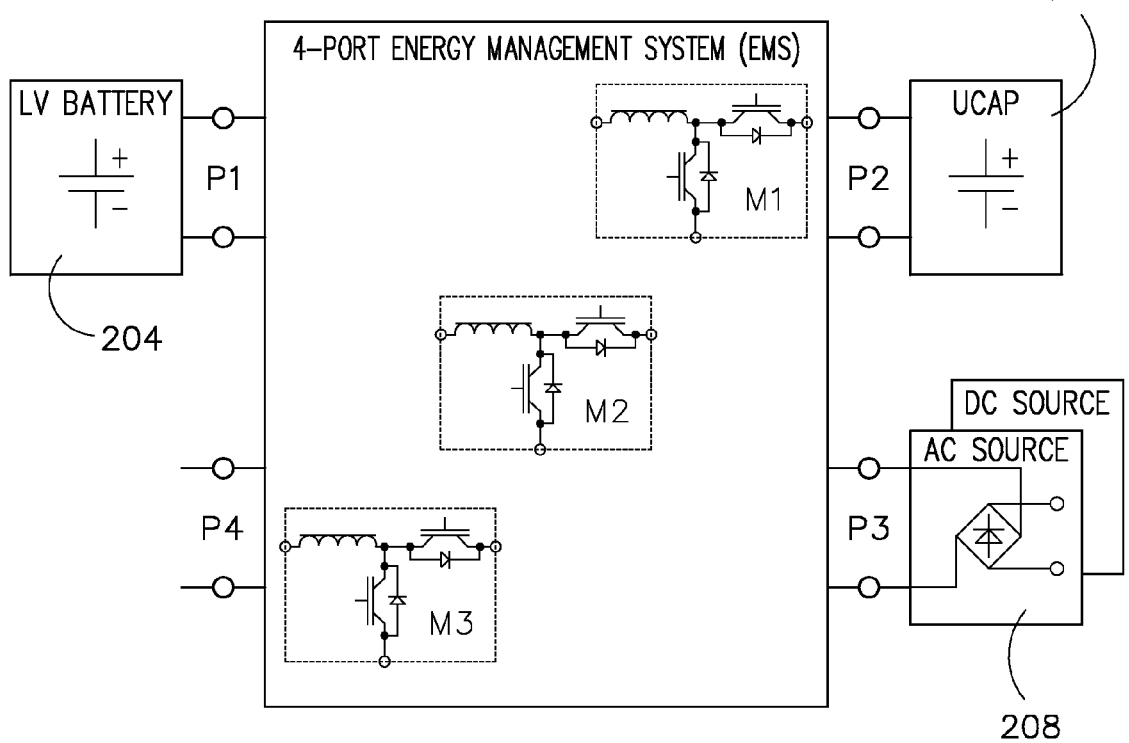
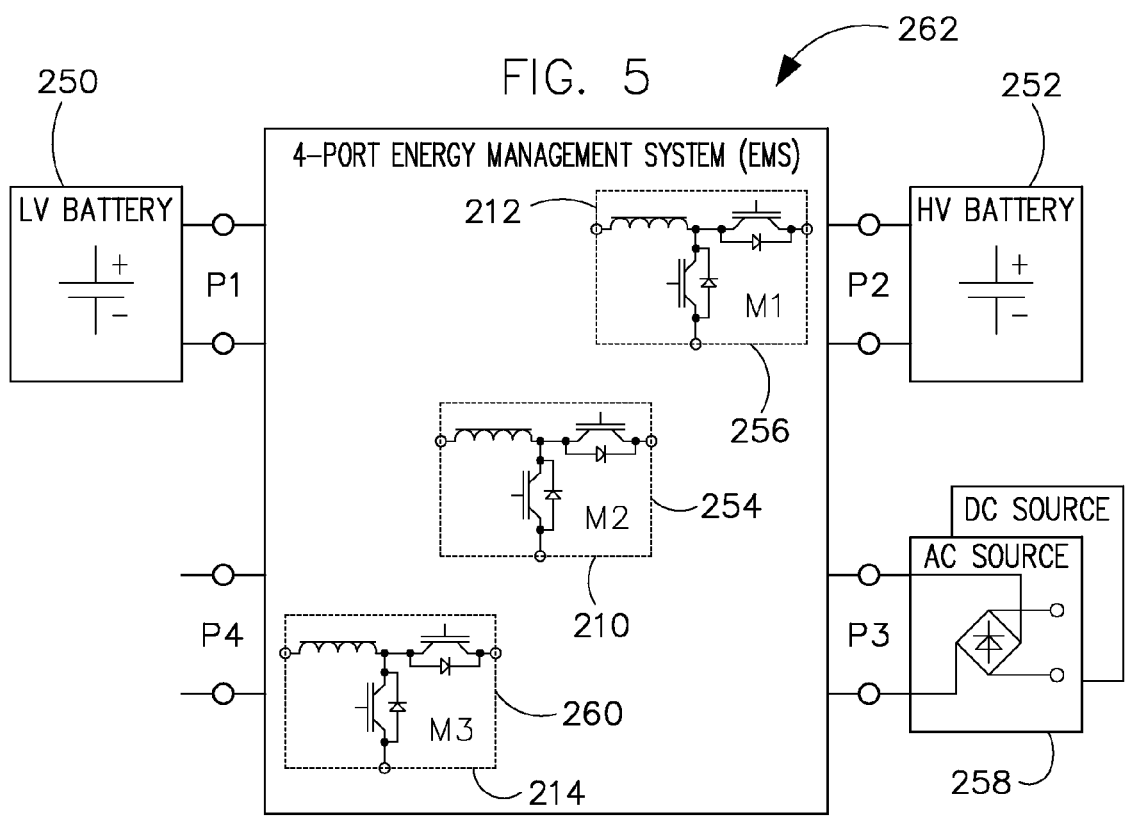

FIG. 10
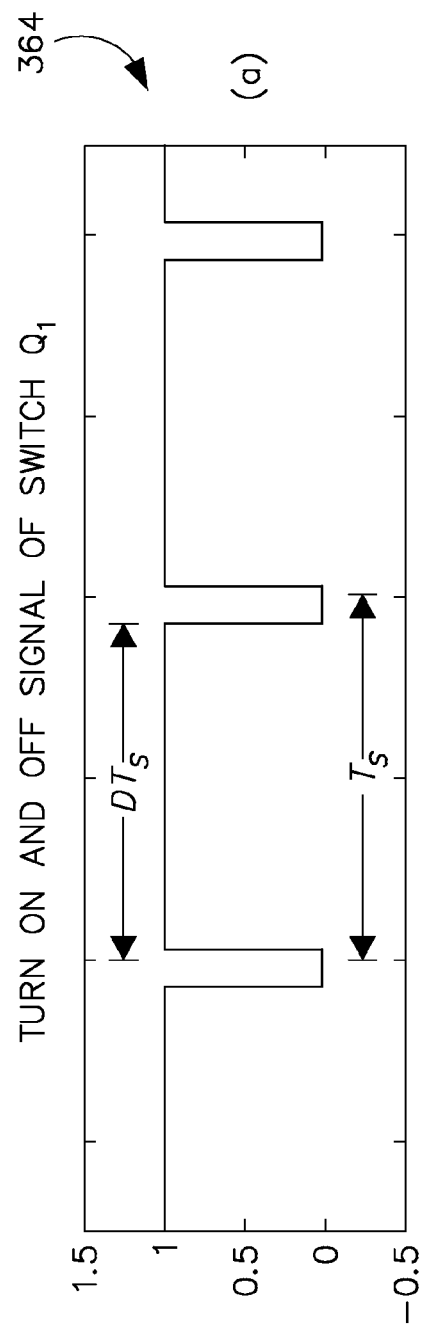
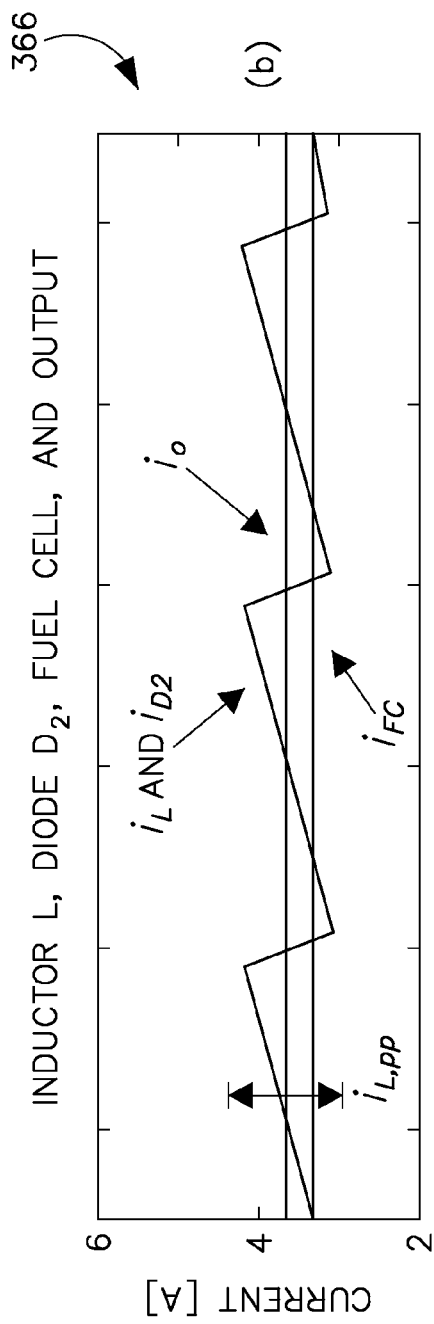

FIG. 12

| $V_1$ | $V_2$ | $V_3$ | $V_4$ | CHARGING OPERATION | KU | KV | KW | UPOS | M |
|---|---|---|---|---|---|---|---|---|---|
| N/A | $V_3 < V_2$ | | N/A | M2U[1] ON, M1 IN BOOST CURRENT CONTROL MODE CHARGE PORT 2 | 1 | 0 | 0 | 0 | 1 |
| N/A | $V_2 < V_3$ | | N/A | M2 IN BUCK CURRENT CONTROL MODE, USED IN M1 TO CHARGE PORT 2 | 1 | 0 | 0 | 0 | 1 |
| $V_1 < V_3 < V_2$ | | | N/A | M2 IN BUCK CURRENT CONTROL MODE, M1 IN BOOST CURRENT CONTROL MODE SIMULTANEOUSLY CHARGE PORT 1 & 2 | 1 | 1 | 0 | 0 | 1 |
| $V_3 < V_1 < V_2$ | | | N/A | M2U ON, M1 IN BOOST CURRENT CONTROL MODE CHARGE PORT 2, M3 IN BUCK CURRENT CONTROL MODE CHARGE PORT 1 | 1 | 0 | 0 | 1 | 0 |
| $V_2 < V_3 < V_1$ | | | N/A | M2 IN BUCK CURRENT CONTROL MODE, USED IN M1 TO CHARGE PORT 2, UNTIL $V_2 > V_1$, THEN UPOS=1, M3 IN BUCK CURRENT CONTROL MODE CHARGE PORT 1 | 1 | 0 | 0 | 0 / 1 | 1 |
| $V_3 < V_2 < V_1$ | | | N/A | M2U ON, M1 IN BOOST CURRENT CONTROL MODE CHARGE PORT 2, UNTIL $V_2 > V_3$, THEN UPOS=1, M3 IN BUCK CURRENT CONTROL MODE CHARGE PORT 1 | 1 | 0 | 0 | 0 / 1 | 1 |
| $V_1 < V_2 < V_3$ | | | N/A | M2 IN BUCK CURRENT CONTROL MODE, CHARGE PORT 1, M1 IN BOOST CURRENT CONTROL MODE | 1 | 1 | 0 | 0 | 1 |
| $V_2 < V_1 < V_3$ | | | N/A | M2 IN BUCK CURRENT CONTROL MODE, USED IN M1 TO CHARGE PORT 2, UNTIL $V_2 > V_1$, THEN UPOS=1, M3 IN BUCK CURRENT CONTROL MODE CHARGE PORT 1 | 1 | 0 | 0 | 0 / 1 | 1 |

[1] M2U: UPPER SWITCH IN MODULE 2

CHARGING OF PORT 4 SIMULTANEOUSLY

APPARATUS AND METHOD FOR CHARGING AN ELECTRIC VEHICLE

BACKGROUND OF THE INVENTION

Embodiments of the invention relate generally to electric drive systems including hybrid and electric vehicles and, more particularly, to charging an electric vehicle using a multiport energy management system.

Hybrid electric vehicles may combine an internal combustion engine and an electric motor powered by an energy storage device, such as a traction battery, to propel the vehicle. Such a combination may increase overall fuel efficiency by enabling the combustion engine and the electric motor to each operate in respective ranges of increased efficiency. Electric motors, for example, may be efficient at accelerating from a standing start, while internal combustion engines (ICEs) may be efficient during sustained periods of constant engine operation, such as in highway driving. Having an electric motor to boost initial acceleration allows combustion engines in hybrid vehicles to be smaller and more fuel efficient.

Purely electric vehicles use stored electrical energy to power an electric motor, which propels the vehicle and may also operate auxiliary drives. Purely electric vehicles may use one or more sources of stored electrical energy. For example, a first source of stored electrical energy may be used to provide longer-lasting energy (such as a low-voltage battery) while a second source of stored electrical energy may be used to provide higher-power energy for, for example, acceleration (such as a high-voltage battery or an ultracapacitor).

Plug-in electric vehicles, whether of the hybrid electric type or of the purely electric type, are configured to use electrical energy from an external source to recharge the energy storage devices. Such vehicles may include on-road and off-road vehicles, golf carts, neighborhood electric vehicles, forklifts, and utility trucks as examples. These vehicles may use either off-board stationary battery chargers, on-board battery chargers, or a combination of off-board stationary battery chargers and on-board battery chargers to transfer electrical energy from a utility grid or renewable energy source to the vehicle's on-board traction battery. Plug-in vehicles may include circuitry and connections to facilitate the recharging of the traction battery from the utility grid or other external source, for example.

Battery chargers are important components in the development of electric vehicles (EVs). Historically, two types of chargers for EV application are known. One is a standalone type where functionality and style can be compared to a gas station to perform rapid charging. The other is an on-board type, which would be used for slower C-rate charging from a conventional household outlet. EVs typically include energy storage devices such as low voltage batteries (for range and cruising, for example), high voltage batteries (for boost and acceleration, for example), and ultracapacitors (for boost and acceleration, for example), to name a few. Because these energy storage devices operate under different voltages and are charged differently from one another, typically each storage device includes its own unique charging system. This can lead to multiple components and charging systems because the storage devices typically cannot be charged using charging systems for other storage devices. In other words, a charging device used to charge a low-voltage battery typically cannot be used to charge an ultracapacitor or a high-voltage battery.

The effect (i.e., many devices) is generally compounded when considering that in some applications it is desirable to rapidly charge the storage device using a "gas station" type charging system, while in other applications it is desirable to slow-charge the storage device using a conventional household outlet. Thus, in order to provide charging capability for multiple energy storage device types and using either a rapid charge or a slow charge system, several charger types may be necessary in order to provide all of the desired functionality. Because each charger type accordingly includes a system of electrical components, reliability of the overall system may be compromised because of the large number of components that may be used in order to provide this functionality. And, although the electric and electronic components can be sized such that electrical stress levels are low, the relatively high on-duty cycle can influence the reliability significantly, as well.

It would therefore be desirable to provide an apparatus to reduce the overall number of electrical components while providing flexibility to charge an EV.

BRIEF DESCRIPTION OF THE INVENTION

According to one aspect of the invention, an energy storage management system (ESMS) includes one or more energy storage devices coupled to a drivetrain and configured to store DC energy, a power electronic conversion system having a plurality of energy ports, the power electronic conversion system comprising a plurality of DC electrical converters, each DC electrical converter configured to step up and to step down a DC voltage, wherein each of the plurality of energy ports is coupleable to each of the one or more energy storage devices and each of the plurality of energy ports is coupleable to an electrical charging system. The EV includes a controller configured to determine a voltage of each energy port having either an energy storage device or a DC electrical charging system coupled thereto, and electrically connect a first energy port to a second energy port of at least two of the energy ports such that at least one of the DC electrical converters either steps up or steps down an input DC voltage based on the determined voltage of each energy port.

In accordance with another aspect of the invention, a method of fabricating an energy storage and management system (ESMS) includes coupling one or more energy storage devices to a vehicle powertrain, fabricating a charging device having a plurality of buck-boost converters, attaching the charging device to the vehicle, the charging device comprising a plurality of energy ports, each of the plurality of energy ports coupleable to each of the one or more energy storage devices, sensing a voltage across each of the plurality of energy ports, determining if an energy storage device and an electrical charging system is coupled to any of the plurality of energy ports based on the sensed voltage, and electrically connecting the electrical charging system to any of the plurality of energy ports having an energy storage device by selectively directing electrical current to flow through one or more of the plurality of buck-boost converters.

In accordance with yet another aspect of the invention, a non-transitory computer readable storage medium positioned on an energy storage and management system (ESMS) and having stored thereon a computer program comprising instructions which when executed by a computer cause the computer to determine a voltage of each energy port of a multi-port power conversion system that is positioned on the ESMS, and electrically connect at least two of the energy ports such that electrical energy passes from a first of the at least two energy ports to a second of the at least two energy ports and through at least two buck-boost converters, a first buck-boost converter of the at least two buck-boost converters configured to operate in a boost mode, and a second buck-boost converter of the at least two buck-boost converters configured to operate in a buck mode.

Various other features and advantages will be made apparent from the following detailed description and the drawings.

BRIEF DESCRIPTION OF THE DRAWINGS

The drawings illustrate embodiments presently contemplated for carrying out the invention.

In the drawings:

FIG. 3 is a table illustrating configurations as of the multi-port charger illustrated in FIG. 2.

FIG. 4 is an illustration of the multi-port charger of FIG. 2 according to one configuration.

FIG. 5 is an illustration of the multi-port charger of FIG. 2 according to one configuration.

FIG. 10 illustrates a typical pulse-width modulation (PWM) switching and waveform.

FIG. 12 illustrates charging arrangements that may be selectively engaged and disengaged of the multi-port charger of FIG. 2.

DETAILED DESCRIPTION

Figure 1:
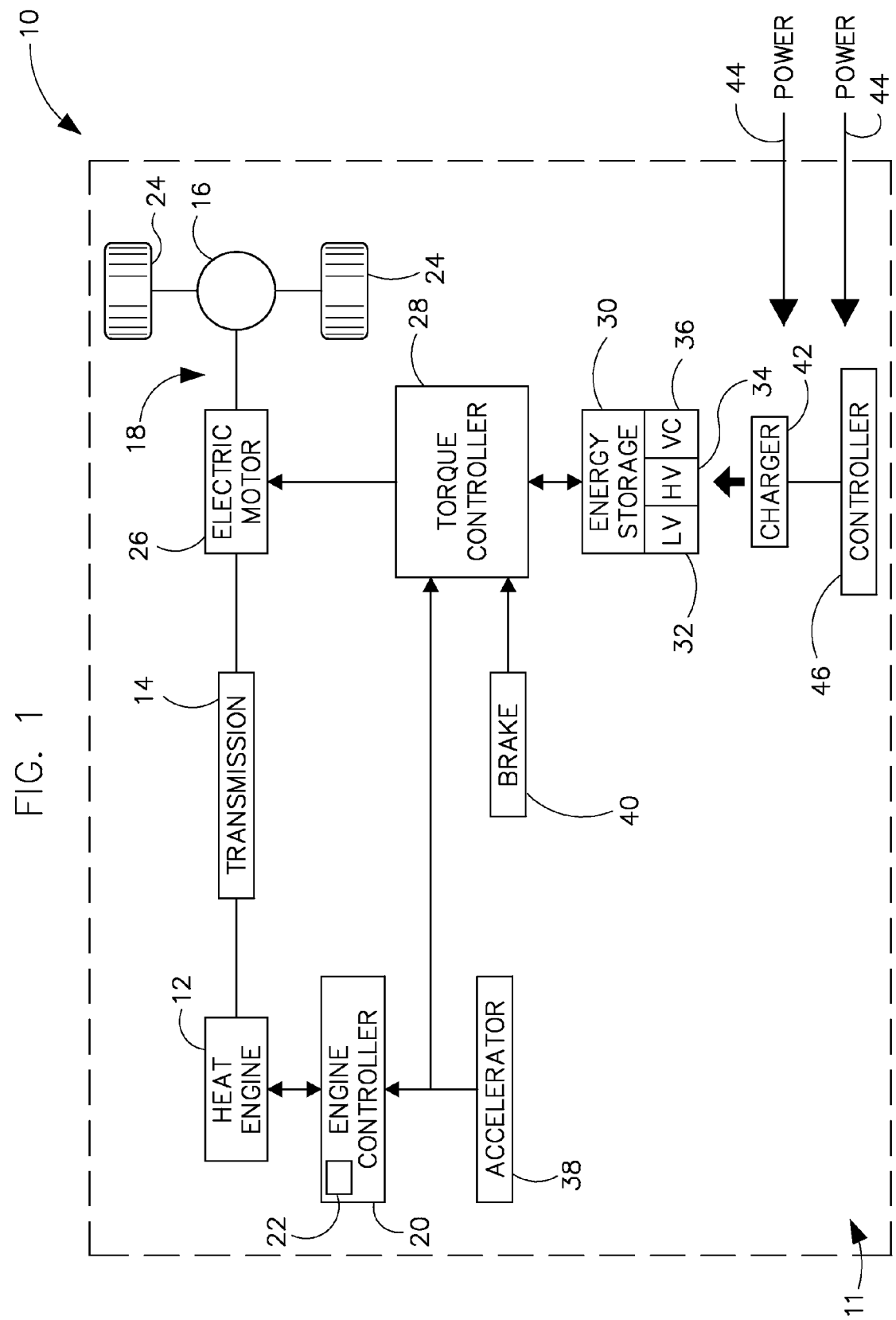
FIG. 1 is a schematic block diagram of an electric vehicle (EV) incorporating embodiments of the invention.

FIG. 1 illustrates one embodiment of a hybrid electric vehicle (HEV) or electric vehicle (EV) 10, such as an automobile, truck, bus, or off-road vehicle, for example, incorporating embodiments of the invention. Vehicle 10 includes an energy storage and management system (ESMS) 11 internal combustion or heat engine 12, a transmission 14 coupled to engine 12, a differential 16, and a drive shaft assembly 18 coupled between transmission 14 and differential 16. And, although ESMS 11 is illustrated in a plug-in hybrid electric vehicle (PHEV), it is understood that ESMS 11 is applicable to any electric vehicle, such as a HEV or EV or other power electronic drives used to operate pulsed loads, according to embodiments of the invention. According to various embodiments, engine 12 may be an internal combustion gasoline engine, an internal combustion diesel engine, an external combustion engine, or a gas turbine engine, as examples.

ESMS 11 includes an engine controller 20 provided to control operation of engine 12. According to one embodiment, engine controller 20 includes one or more sensors 22 that are configured to sense operating conditions of engine 12. Sensors 22 may include an rpm sensor, a torque sensor, an oxygen sensor, and a temperature sensor as examples. As such, engine controller 20 is configured to transmit or receive data from engine 12. Vehicle 10 also includes an engine speed sensor (not shown) that measures a crankshaft speed of engine 12. According to one embodiment, speed sensor may measure engine crankshaft speed from a tachometer (not shown) in pulses per second, which may be converted to a revolutions per minute (rpm) signal.

Vehicle 10 also includes at least two wheels 24 that are coupled to respective ends of differential 16. In one embodiment, vehicle 10 is configured as a rear wheel drive vehicle such that differential 16 is positioned near an aft end of vehicle 10 and is configured to drive at least one of the wheels 24. Optionally, vehicle 10 may be configured as a front-wheel drive vehicle.

In one embodiment, transmission 14 is a manually operated transmission that includes a plurality of gears such that the input torque received from engine 12 is multiplied via a plurality of gear ratios and transmitted to differential 16 through drive shaft assembly 18. According to such an embodiment, vehicle 10 includes a clutch (not shown) configured to selectively connect and disconnect engine 12 and transmission 14.

Vehicle 10 also includes an electromechanical device such as an electric motor or electric motor/generator unit 26 coupled along drive shaft assembly 18 between transmission 14 and differential 16 such that torque generated by engine 12 is transmitted through transmission 14 and through electric motor or electric motor/generator unit 26 to differential 16. A speed sensor (not shown) may be included to monitor an operating speed of electric motor 26. According to one embodiment, electric motor 26 is directly coupled to transmission 14, and drive shaft assembly 18 comprises one axle or drive shaft coupled to differential 16.

A hybrid drive control system or torque controller 28 is provided to control operation of electric motor 26 and is coupled to motor/generator unit 26. An energy storage system 30 is coupled to torque controller 28 and comprises a low voltage energy storage or energy battery 32, a high voltage energy storage or power battery 34, and an ultracapacitor 36, as examples. However, although a low voltage energy storage 32, a high voltage energy storage 34, and an ultracapacitor 36 are illustrated, it is to be understood that energy storage system 30 may include a plurality of energy storage units as understood in the art such as sodium metal halide batteries, sodium nickel chloride batteries, sodium sulfur batteries, nickel metal hydride batteries, lithium ion batteries, lithium polymer batteries, nickel cadmium batteries, a plurality of ultracapacitor cells, a combination of ultracapacitors and batteries, or a fuel cell, as examples. An accelerator pedal 38 and brake pedal 40 are also included in vehicle 10. Accelerator pedal 38 is configured to send throttle command signals or accelerator pedal signals to engine controller 20 and torque control 28.

System 10 includes a charger 42 coupled to energy storage units 32-36 of energy storage system 30, according to embodiments of the invention. Charger 42 may be coupled to multiple energy storage systems 32-36, as illustrated and charger 42 may be coupled to one or multiple power input lines 44, two of which are illustrated, according to embodiments of the invention. That is, charger 42 illustrates an embodiment of the invention, and charger 42 may be coupled to one or multiple energy storage systems, and charger 42 may be coupled to one or multiple power input systems 44, according to embodiments illustrating use of the invention. Charger 42 includes a controller 46 that is configured to selectively engage and disengage DC electrical devices or buck-boost modules of charger 42 as will be discussed.

And, although charger 42 is illustrated as being coupled to energy storage systems 32-36, and charger 42 is illustrated as coupled to one or multiple power input lines 44, it is to be understood that embodiments of the invention are not to be so limited. Instead, it is to be understood that charger 42 may be coupled to multiple and varying types of energy storage systems and power inputs, some of which are illustrated in the following figures. Further, it is to be understood that there may be multiple chargers 42 per vehicle in parallel, or that there may be power systems applied to each wheel 24 of vehicle 10, each having a charger 42 coupled thereto.

In operation, it is understood in the art that energy may be provided to drive shaft assembly 18 from internal combustion or heat engine 12 via transmission 14, and energy may be provided to drive shaft assembly 18 via drive control system 28 having energy drawn from energy storage system 30 that may include energy systems 32-36. Thus, as understood in the art, energy may be drawn for vehicle 10 boost or acceleration from, for instance a high voltage storage device 34 that may include a battery, as an example, or from ultracapacitor 36. During cruising (i.e., generally non-accelerating operation), energy may be drawn for vehicle 10 via a low voltage storage device such as low voltage energy storage 32.

And, during operation, energy may be drawn from internal combustion or heat engine 12 in order to energy storage 30 or provide power to drive shaft assembly 18 as understood in the art. Further, some systems include a regenerative operation where energy may be recovered from a braking operation and used to re-charge energy storage 30. In addition, some systems may not provide regenerative energy recovery from braking and some systems may not provide a heat engine such as internal combustion or heat engine 12. Nevertheless and despite the ability of some systems to re-charge energy storage 30, energy storage 30 periodically requires re-charging from an external source such as a 115 V household supply or a 230 V 3-phase source, as examples. The requirement to re-charge energy storage 30 is particularly acute in a plug-in hybrid electric vehicle (PHEV) having no heat engine to provide power and an extended range of driving operation.

Thus, embodiments of the invention are flexible and configurable having a plurality of energy ports, and may be coupled to multiple power sources and source types in order to charge one or multiple energy storage types. Further, as will be illustrated, embodiments of the invention allow charging of an energy storage unit that is fully depleted and having a starting voltage that is below a voltage of a power source, and embodiments of the invention allow charging of an energy storage unit to voltages that are in excess of a voltage of the power source.

To meet the demands of modern PHEVs and EVs, the infrastructure should provide typically 7 kW to achieve a state-of-charge (SOC) gain of 80% (assuming a 25 kWh battery) in a charging time of 2 or 3 hours (home charging). For a more aggressive short stop fast charging scenario (e.g., a "gas station") significant higher power levels may be required to achieve a desired 80% SOC in 10 minutes. The vehicle interface needs to be designed according to existing standards. A pilot signal determines by its duty cycle the maximum allowable power. Besides a high degree of integration the proposed system provides also single and or three phase AC input, high efficiency, low harmonics, nearly unity input power factor, low cost, low weight and safety interlocking of the equipment. The power factor correction (PFC) requirement may be driven by IEC/ISO/IEEE line harmonic current regulations, as known in the art.

Illustrated in the following figures is an energy management system with an integrated charger unit consisting of three bi-directional buck-boost stages and a charger front end. The system includes also a charger module for high voltage DC and standard AC outlet charging.

This invention is applicable to conventional electric vehicles (EVs) as well as grid-charged hybrid electric vehicles (PHEVs). Grid-charged HEVs provide the option to drive the vehicle for a certain number of miles (i.e., PHEV20, PHEV40, PHEV60). Traditionally, the goal for PHEVs is to provide a high all-electric-range (AER) capability to lower operating cost and be able to optimize the operating strategy. In terms of the buck-boost stages, the charger front-end and interface, it generally makes no difference if it is designed for an EV or PHEV application. The role of the DC/DC converter is an efficient energy transfer between two or more energy sources, reliable for continuous and peak power demands. The integration of the charger unit is the next step towards a higher power density design with fewer components and therefore higher reliability. As such, embodiments of the invention are applicable to multiple electric vehicles, including all-electric and hybrid electric vehicles, as examples, designated generally and broadly as "EV"s. Such EVs may include but are not limited to road vehicles, golf carts, trains, and the like, capable of having power systems that include an electric component for causing motion of the vehicle.

In conventional implementations many seperate units coexist, to include generally a separate charger, battery management and control unit that are interconnected. In an automotive environment with advanced batteries, communications between the charger and battery or other vehicle systems from different vendors seamless integration is an important consideration. The energy management system with integrated charger is advantageous in that aspect that there is less integration effort required and fewer components improve reliability.

Figure 2:
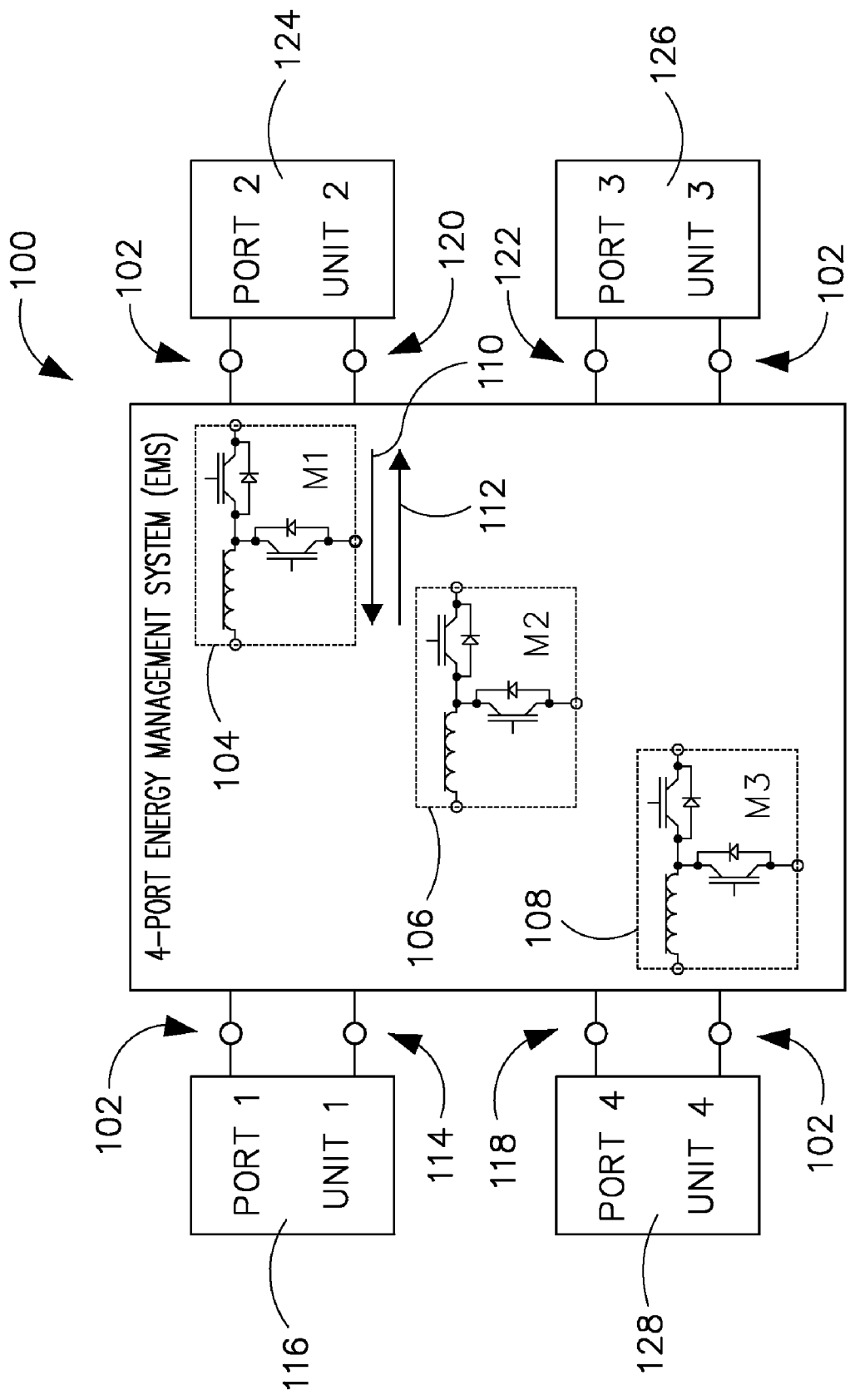
FIG. 2 is a schematic diagram of a configurable multi-port charger architecture according to an embodiment of the invention.

Referring now to FIG. 2, a configurable multi-port integrated charger architecture, energy storage and management system (ESMS, otherwise referred to as energy management system (EMS)) ESMS 100, such as charger 42 is illustrated having four energy ports 102 and three DC electrical conversion devices or buck-boost converters respectively as modules 1, 2, and 3 104 106, 108. As known in the art, buck-boost converters 104-108 may be configured to operate in either a buck-mode by flowing electrical energy therethrough in a first direction 110 (illustrated with respect to buck-boost converter 104, but equally applicable to converts 106 and 108), or a boost mode by flowing electrical energy in a second direction 112 (illustrated again with respect to buck-boost converter 104, but equally applicable to converts 106 and 108). As illustrated, energy ports 102 comprise a first energy port 114 configurable to have a first unit 116 attached or electrically coupled thereto. Similarly, energy ports 102 energy port 118 120 122 are configurable to have respective second unit 124, third unit 126, and fourth unit 128 attached or electrically coupled thereto.

According to the invention the charger is entirely part of the vehicle design and mounted on-board. The integrated on-board charger is capable of continuously adjusting an input current as a result of, for instance, a state-of-charge (SOC) of a device connected thereto for charging. The integrated charger energy management system is equipped with a minimum number of standard components and is thus able to efficiently charge a plurality of energy storage systems and system types while having a minimum cost. In one embodiment, each of the shown basic modules is furthermore equipped with only one additional contactor to perform the different functions described below and to allow isolation of the ports. The configuration of the three individual modules M1 to M3 in FIG. 2 in conjunction with the appropriate charging algorithm allows energy transfer from a rectified AC or directly from a DC source to different energy storage units connected to the ports of the ESMS.

As will be illustrated, ESMS 100 of FIG. 2 may be configured to charge up to three energy sources (to include low voltage energy batteries, high voltage power batteries, ultracapacitors, as examples) at the same time or simultaneously. ESMS 100 may have modules therein configured to be interleaved in order to lower ripple current. ESMS 100 also is capable of having multiple charging profiles as a function of SOC and temperature, as examples, for different battery technologies and storage device types. ESMS 100 includes a centralized energy flow control that is centrally controlled by a controller such as controller 46 of FIG. 1, and ESMS 100 is capable of managing a wide range of input and output voltages.

ESMS 100 of FIGS. 1 and 2 is configurable in multiple configurations as illustrated in FIG. 3 as a table 200. Each configuration of ESMS 100 may be selectable by contactors (not illustrated), as understood in the art, and energy flow is controlled by ESMS control algorithms, implemented in controller 46 of hybrid vehicle 10, which can sense a presences of both energy storage devices and charging devices connected to ports 102 and adjust a flow of direction of energy, accordingly. For instance, the control algorithms may determine a voltage of each port to which an energy storage device or an electrical charging system (DC or rectified AC, as examples) is coupled, and operate ESMS 100 accordingly and based on the determined voltages, based on a measured frequency, or both (as examples). And, a benefit for including a rectifier is that even if DC is connected having the wrong polarity, the rectifier provides protection, even if a single phase rectifier is used or if a DC input is used to two of the 3-phase inputs for a 3-phase rectifier.

Single Battery with Integrated Wide Input Range Charger.

According to a first configuration 202, illustrated in FIG. 4, EMS or ESMS includes a low voltage battery 204 that is illustrated as connected to port 1 and an ultracapacitor bank 206 that is connected to port 2. In this configuration a single low voltage battery, which represents the main energy storage unit for the EV, is connected to port 1. The high voltage port 2 is connected to a ultracapacitor bank or just to the DC link capacitors supplying the motor inverter. A charging unit 208 is connected to port 3, which may include either a DC source or a rectified AC source, according to embodiments of the invention. For this case if a charging input voltage at port 3 is higher than the energy battery 204 on port 1, module 2 operates in buck mode.

Two cases may be considered. First, if the nominal voltage of the energy battery on port 1 is lower than the lowest charger input voltage, then the charging algorithm operates as just described. Second, if the nominal voltage of the battery 204 is higher than the charger 208 input voltage, module 2 210 is permanently conducting, module 1 212 operates in boost mode and module 3 214 operates in buck mode to charge the battery 204.

In a second configuration for this section (not illustrated) an energy/power battery may instead be connected to port 2. The remaining ports of the ESMS are left floating. In this scenario two cases are considered depending on the instantaneous voltage level (SOC). For normal SOC levels, where $V_2$ (voltage on port 2) is higher than $V_3$ (voltage on port 3, charger input) module 2 is permanently conducting and module 1 operates in boost mode. For the case where the battery is low in SOC ($V_2<V_3$) module 2 operates in buck and module 1 in boost mode.

Dual Battery with Integrated Wide Input Range Charger.

Referring now to FIG. 5, in this configuration an energy battery 250 on port 1 represents the main energy storage unit for the EV, and a high voltage or power battery 252 is connected to port 2. The integrated wide input voltage range charger allows independent or simultaneously charging of both batteries 250, 252. The energy battery 250 on port 1 has typically lower nominal voltages than the power (boost) battery 252. However, in this configuration charging is also possible even if the port 1 or port 2 voltage is very low. This would be the case if either one of the two batteries (energy side 250 or power side 252) is completely discharged. Module 2 254 operates in buck mode and module 1 256 in boost mode. If the charging input 258 (DC or rectified AC) voltage is lower than the port 1 voltage, module 2 210 is turned on all time, module 1 256 boosts to port 2 voltage levels and module 3 260 charges the energy battery 250 on port 1.

And, although FIG. 5 illustrates a charging configuration from a rectified AC source, it may be misleading that merely relatively low voltages can be used for charging. In fact, the used port (for charging, port 3) has little restrictions in terms of voltage levels. Port 4, for example, allows voltage up to a maximum of the overall charger system 262, which may also be device-dependent. As such, the illustrated configuration of FIG. 5 is capable of relatively high voltage charging (e.g., IEC mode 4: 400 VDC).

Figure 6A:
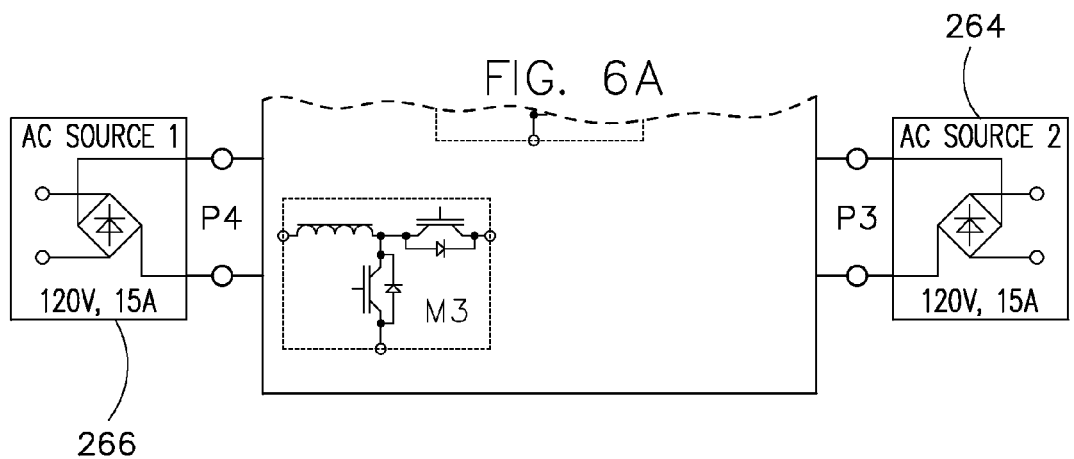
FIGS. 6A and 6B are illustrations of the multi-port charger of FIG. 5 according to alternate configurations.
Figure 6B:
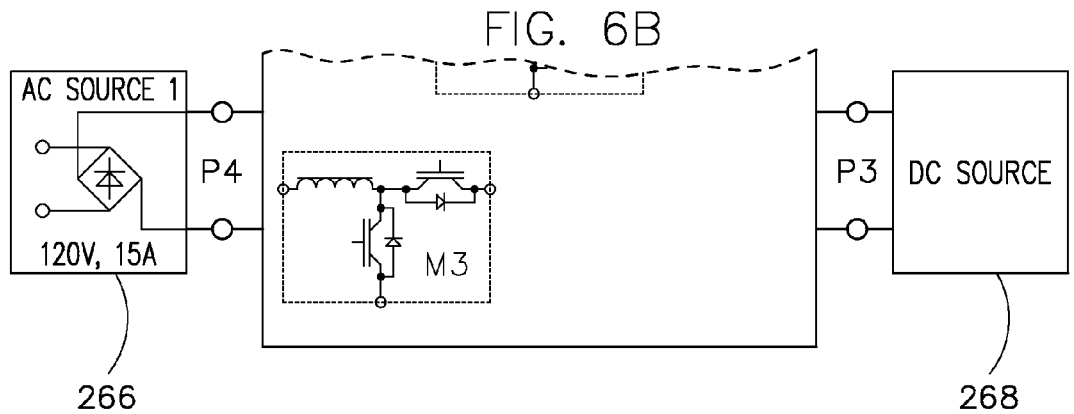

Embodiments of the invention allow simultaneous charging of energy storage devices from more than one charging source. In one example, a second charging system may be interfaced with an ESMS, as illustrated in FIG. 6A. Thus, FIG. 6A illustrates a cutaway lower portion of an ESMS. In illustrated embodiments above, EV applications include two energy storage units, where port 4 is free of use, and a DC source or rectified AC source 264. However, according to embodiments of the invention, a rectified AC source 266 may be coupled to port 4, as illustrated, which allows faster charging from a second outlet. Thus, according to embodiments of the invention, ports 3 and 4 may be configured having respective electrical sources coupled thereto in order to charge storage devices that are coupled to, for instance, ports 1 and 2 of FIGS. 4 and 5, as examples. However, FIG. 6B illustrates an alternate embodiment having rectified AC source 266 coupled thereto and a DC source 268 coupled to port 3.

One advantage of simultaneous charging with multiple sources such as an AC and a DC source is that high power rapid charging can be performed without a need to potentially increase the charge connector beyond what is already a standard (or expected may become a standard). For example, if the AC source and associated mating connectors is designed for level 2, for example 22 kW, and the DC source and associated mating connectors are designed for level 3 or possibly level 4 DC rapid charging at, for instance, approximately 50 kW, then simultaneous charging from both AC and DC sources using embodiments of the invention can be performed at 72 kW by using standard charger connector units (assuming the charge station is able to support these power levels). Without this feature the maximum charge may be approximately 22 kW through the level 2 AC charge connector or 50 kW through the level 3 or level 4 DC charge connector. Furthermore, if the vehicle is only equipped with a level 2 3-phase charge connector, control within the ESMS could be implemented to allow the DC input to be connected to two of the three input terminals and controlled to operate at level 2 at up to 22 kW charge level, depending on the specific current capability for the connector. For another case where the vehicle is equipped with only AC charge connectors, for example a 3-phase level 2 AC input at 22 kW and single phase level 2 AC at approximately 7.4 kW, simultaneous charging using both AC connectors could be provided at approximately 29.4 kW levels.

Triple Battery with Integrated Wide Input Range Charger.

Figure 7:
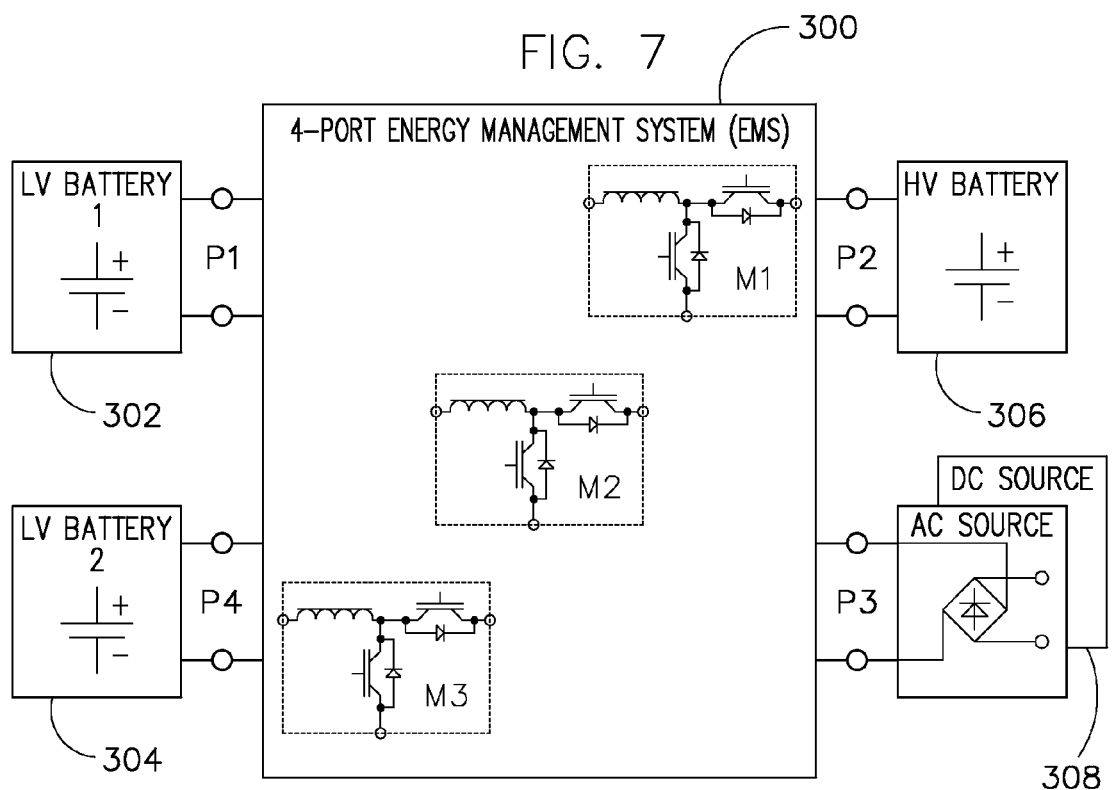
FIG. 7 is an illustration of the multi-port charger of FIG. 2 according to one configuration.

Referring to FIG. 7, a triple energy storage configuration is illustrated that allows charging from a wide voltage range input, according to an embodiment. According to the illustrated configuration, EMS or ESMS 300 includes a first low voltage battery 302 is coupled to port 1, a second low voltage battery 304 coupled to port 4, a high voltage or boost battery 306 coupled to port 2, and a DC source or rectified AC source 308 coupled to port 3. In one example, source 308 is a rectified DC source which can protect for inadvertently connecting across port 3 having an incorrect polarity. In one example, the second low voltage battery 304 may be a backup energy battery which allows a higher level of redundancy for safety-critical applications.

Boost Battery with Low Voltage Charger.

Figure 8:
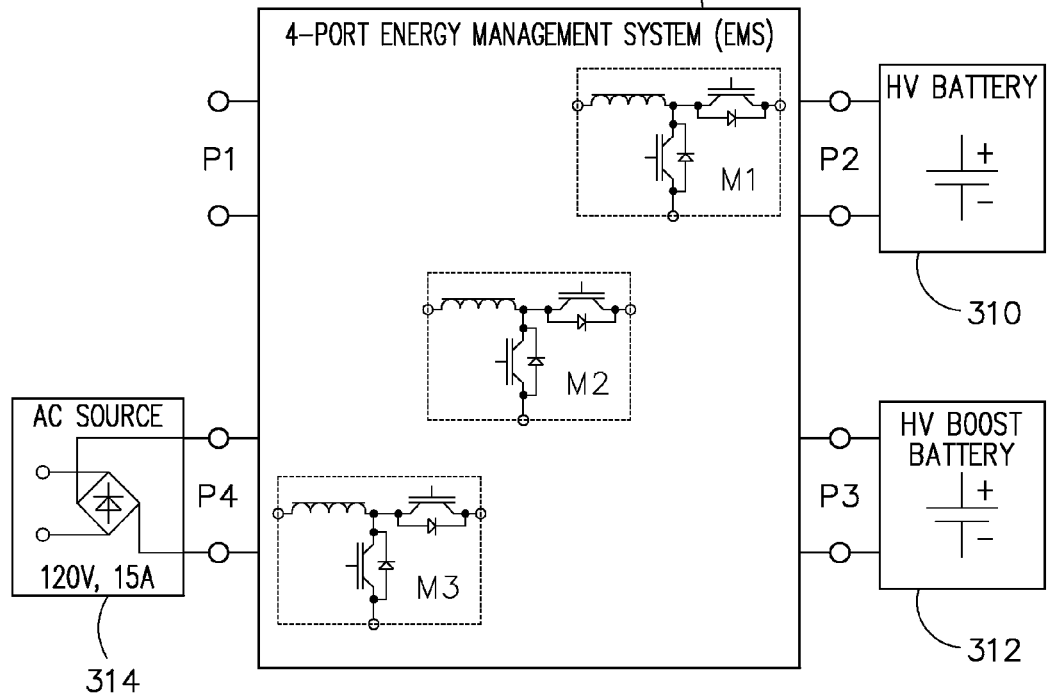
FIG. 8 is an illustration of the multi-port charger of FIG. 2 according to one configuration.

Referring to FIG. 8, two boost batteries 310, 312 may be connected to respective ports 2 and 3, which may be charged using a DC source or rectified AC source 314 coupled to port 4. Thus, two high power/high voltage energy storage units can be connected in parallel in order to achieve maximum boost performance while a certain degree of energy management is still maintained. However, instead of simply paralleling the two units, ESMS 316 acts as a balancing stage while power delivery capability is similar to a parallel configuration.

Dual Battery with Integrated Wide Input Range Charger and Interleaving.

Figure 9:
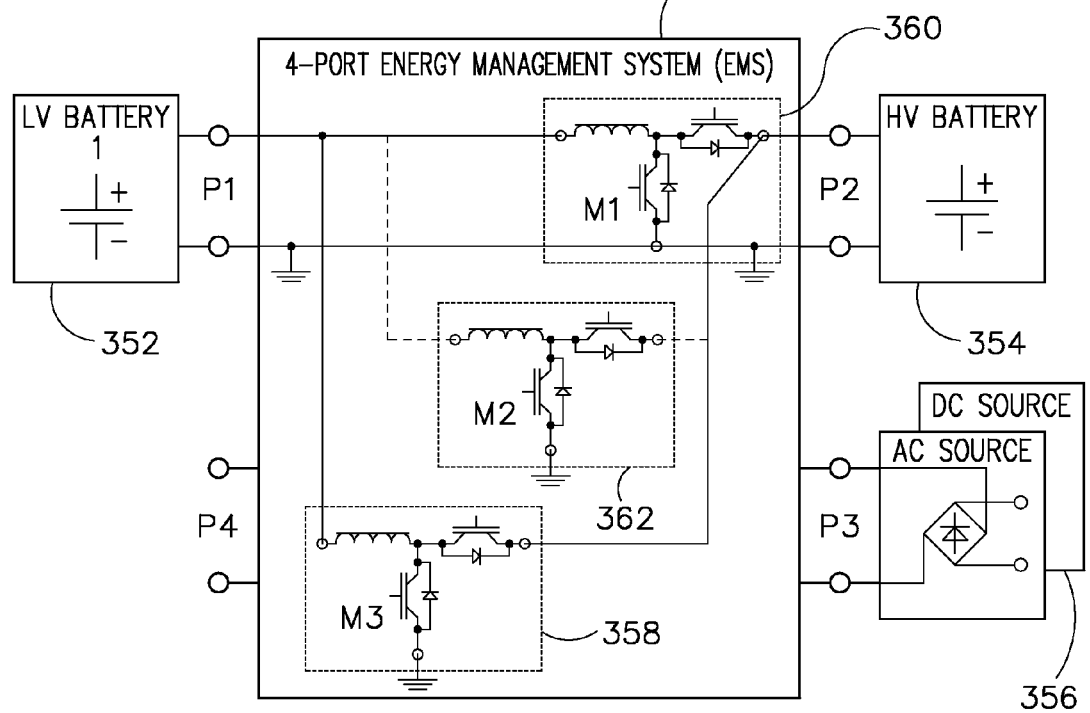
FIG. 9 is an illustration of the multi-port charger of FIG. 2 according to one configuration.

Referring to FIG. 9, EMS or ESMS 350 is coupled to energy devices in much the same fashion as that illustrated above with respect to FIG. 5. As such, a low voltage battery 352 is coupled to port 1, a high voltage battery 354 is coupled to port 2, and a rectified AC source or DC source 356 is coupled to port 3. However, in this mode, module 3 358 is used to interleave during operation of ESMS 350 in order to minimize output current ripple.

That is, in interleaved mode, power is transferred through two or three modules (module 1 360, module 2 362, and module 3 358) and produces a smaller output current ripple, compared to that of FIG. 5, while at the same time reduces the size of magnetic and other components. For interleaved mode with two modules, module 1 360 and module 3 358 are connected as shown in FIG. 9. Further, FIG. 10 shows a typical pulse-width modulation (PWM) switching 364 and current waveform 366. In interleaving mode the PWM to module 2 362 is generally similar in frequency, just shifted in time by Ts/2 relative to the PWM signal of module 1 360. And, three modules operate in interleaving, the PWM signals to the module 2 362 and module 3 358 are shifted, respectively, by Ts/3 and 2 Ts/3.

Figure 11:
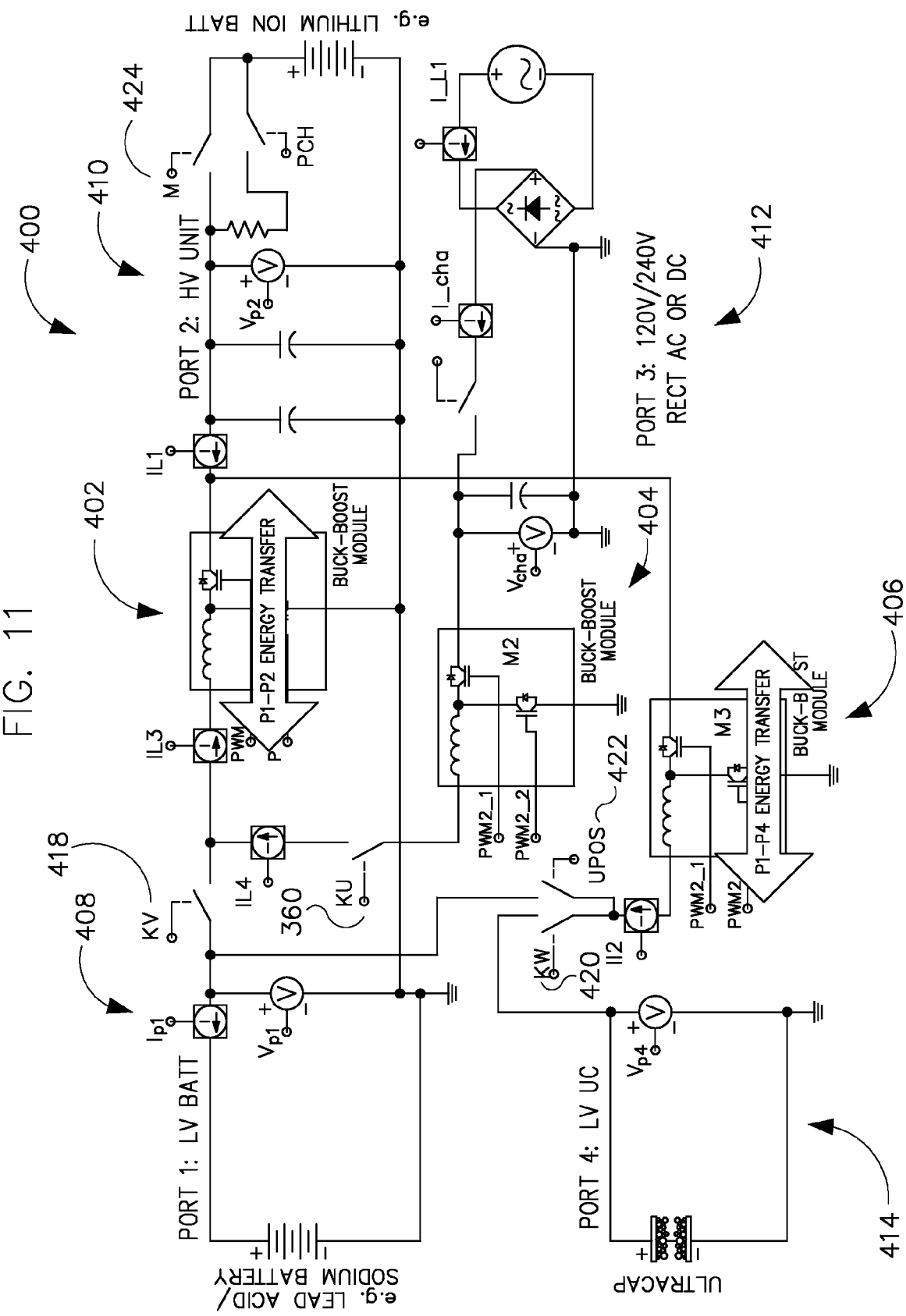
FIG. 11 illustrates a block diagram of a multi-port charger according to an embodiment of the invention.

FIG. 11 illustrates a block diagram of a multi-port ESMS according to an embodiment of the invention. Thus, in the aforementioned embodiments, contactors illustrated in FIG. 11 may be controlled according to the table illustrated in FIG. 12.

Referring first to FIG. 11, for simplicity, control electronic components are omitted. Thus, ESMS 400 illustrates a first buck-boost module 402, a second buck-boost module 404, and a third buck-boost module 406. ESMS 400 also illustrates port 1 408 having a low voltage battery coupled thereto, port 2 410 having a high voltage unit coupled thereto, port 3 412 having a rectified AC or DC voltage coupled thereto, and port 4 414 having a low voltage ultracapacitor coupled thereto. Thus, in the example illustrated, energy storage devices and an energy charger are coupled to ESMS 400 in order to illustrate operation according to one configuration. However, as discussed, ESMS 400 may be configured in numerous arrangements in order to accommodate multiple charger/energy storage arrangements. As such, ESMS 400 includes contactors KU 416, KV 418, KW 420, UPOS 422, and M 424 which may be selectively engaged or disengaged in order to accomplish configurations for charging, according to the illustrations above.

Each of the three buck-boost modules 402, 404, 406 includes an IGBT leg (upper and lower switch) and an inductor. The high voltage DC bus is buffered by a number of power capacitors. Each buck-boost converter stage output is equipped with a current sensor, which measures an inductor current. Voltage limits show at port 3 are originated by typical single-phase AC outlet voltages in both the US and Europe.

ESMS 400 uses contactors as main bus and individual module switches. The pre-charge circuit is realized using two power resistors (e.g., 120 ohm, 100 W, RH-50) and a contactor or FET. An additional contactor (UPOS 422 in FIG. 11) serves in two cases. One is under a certain SOC condition of a battery at port 1, and the second if interleaving of module 1 and module 3 is enabled. FIG. 11 illustrates voltage and current sense points of ESMS 400 having an integrated charger.

Thus, referring now to FIG. 12, one skilled in the art will recognize that control of specific charging operations may be by selective engagement and disengagement of contactors 416-424.

It will be recognized that in configurations illustrated herein, multi-port energy management is fully functional. Even if for some reason it is desired to equip the system with a separate charger, the multi-port ESMS still performs its function, which is at a minimum energy management between ports 1, 2 and 4. After completed pre-charge of the DC link capacitors, the ESMS sets the individual phase state machines into manual mode and sets the current commands and starts regulating after a sanity check of the contactor states.

Figure 13:
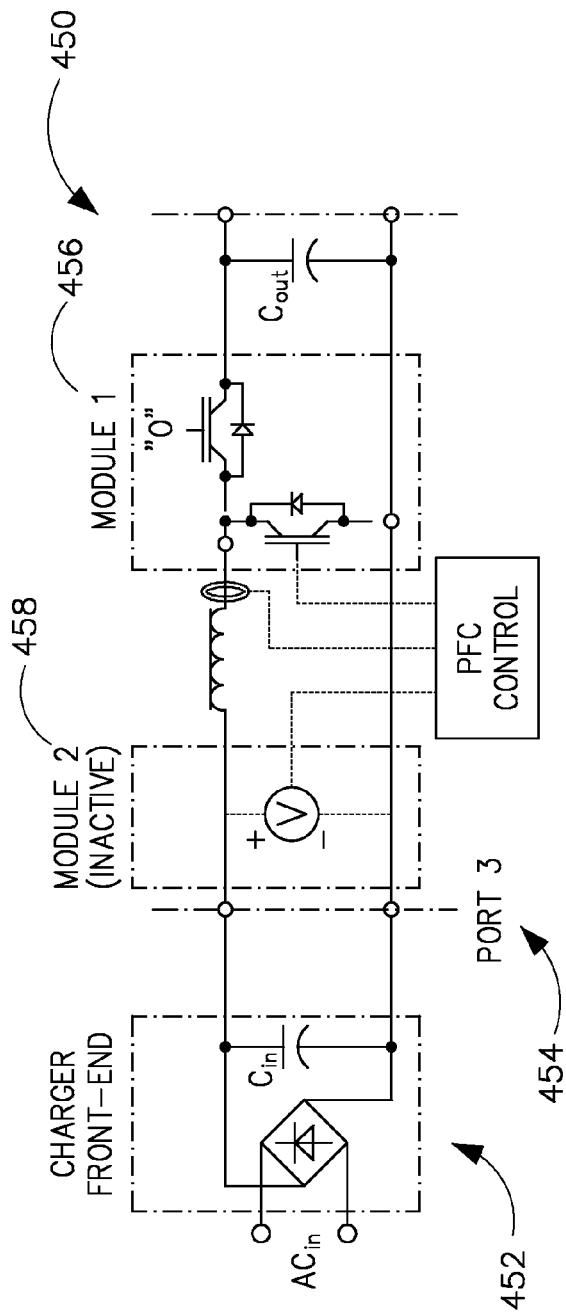
FIG. 13 illustrates a multi-port charger having a 1-phase AC source.

Referring now to FIG. 13, port 3 of the illustrated ESMS 450 may be charged from a 1-phase AC source 452, thus a simple high-power factor boost pre-regulator can be realized according to an embodiment of the invention. If ESMS 450 is connected to a single-phase rectifier on port 3 454, for instance, as shown in FIG. 13, module 1 456 and module 2 458 are used by operating in a high-power factor regulator mode. Thus, FIG. 13 illustrates a simple approach of a rectified AC source having a power factor correction (PFC) pre-regulator, $C_{in}$ is a small high frequency bypass capacitor, and $C_{out}$ is a bulk storage capacitor or DC bus capacitor.

Thus, there are two basic functions the control in AC mode is performing. First is to limit the maximum charging current drawn from the utility grid to the specified maximum that is limited by the line or circuit breaker. Second, the PFC boost stage shapes the current to minimize the phase angle between input current and input voltage. The circuit illustrated is essentially a boost converter with wide input range that is capable of precisely controling an input current (current shaping). The current in waveshape and phase to the input voltage is controlled instantaneously. A relatively large capacitor at the output of the boost stage supplies short peak energy demands, while the input capacitor is reduced to a few microfarads.

Any desired EMI filter are not shown in the previous figures. EMI filter components are standards components and will be connected between the corresponding front-end and the mechanical interface to the HVSE, as understood in the art.

Figure 14:
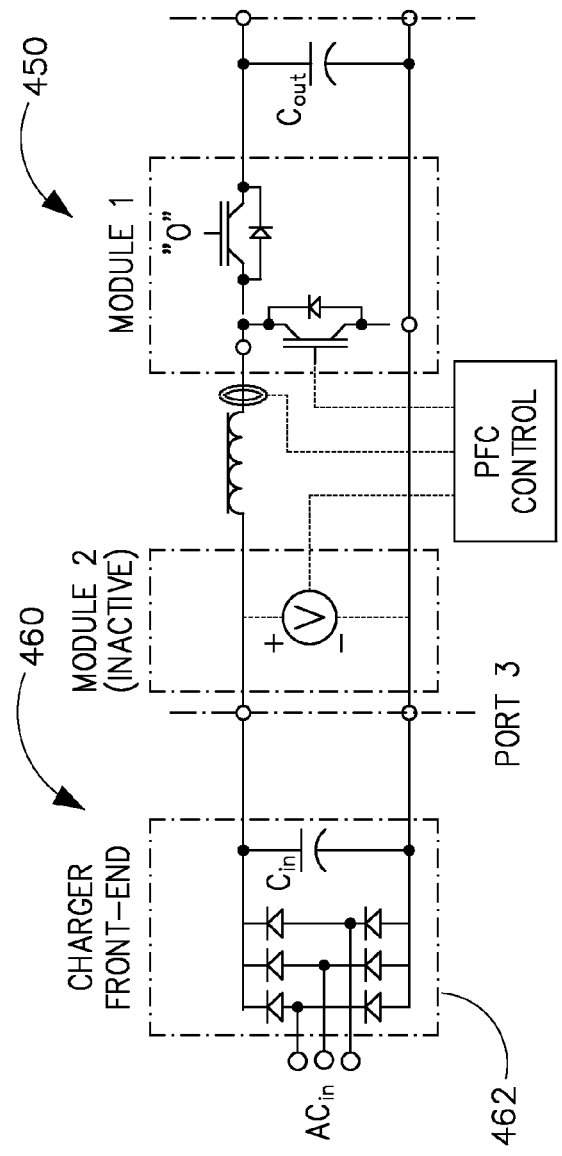
FIG. 14 illustrates a multi-port charger having a 3-phase AC source.

Referring now to FIG. 14, ESMS 450 can include a rectifier front-end 460 for a 3-phase charger input 462 designed in a similar fashion as that illustrated in FIG. 13.

In an additional embodiment, an integrated charger configuration of ESMS port 3 of FIGS. 13 and 14 can be used as a charger input. A type control of charging depends on a voltage level as indicated in FIG. 12, having corresponding contactor states KU=closed, KV=open, KW=open, UPOS=open, and M=closed.

Figure 15:
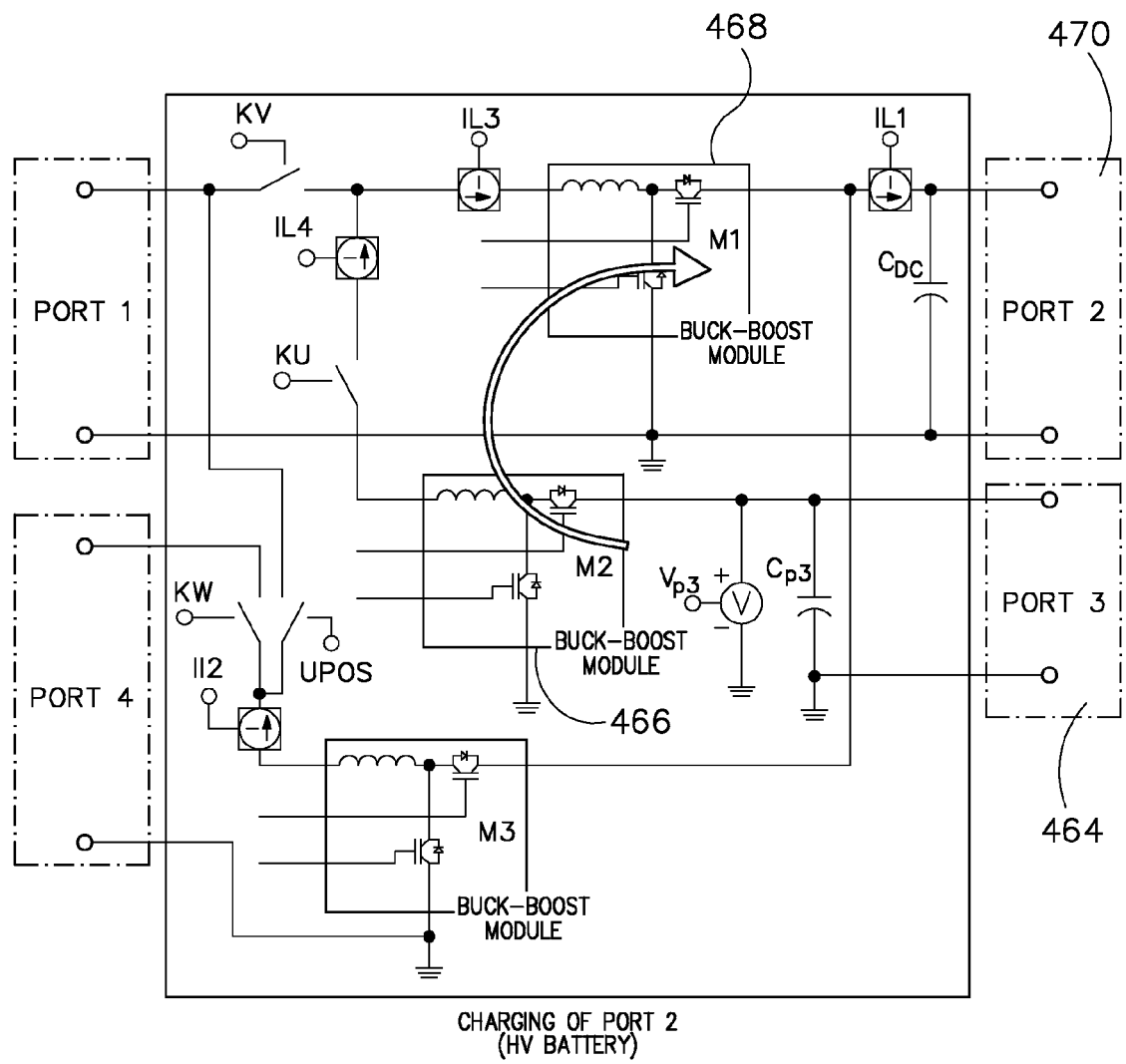
FIG. 15 illustrates energy flow in a multi-port charger according to a configuration of operation.
Figure 16:
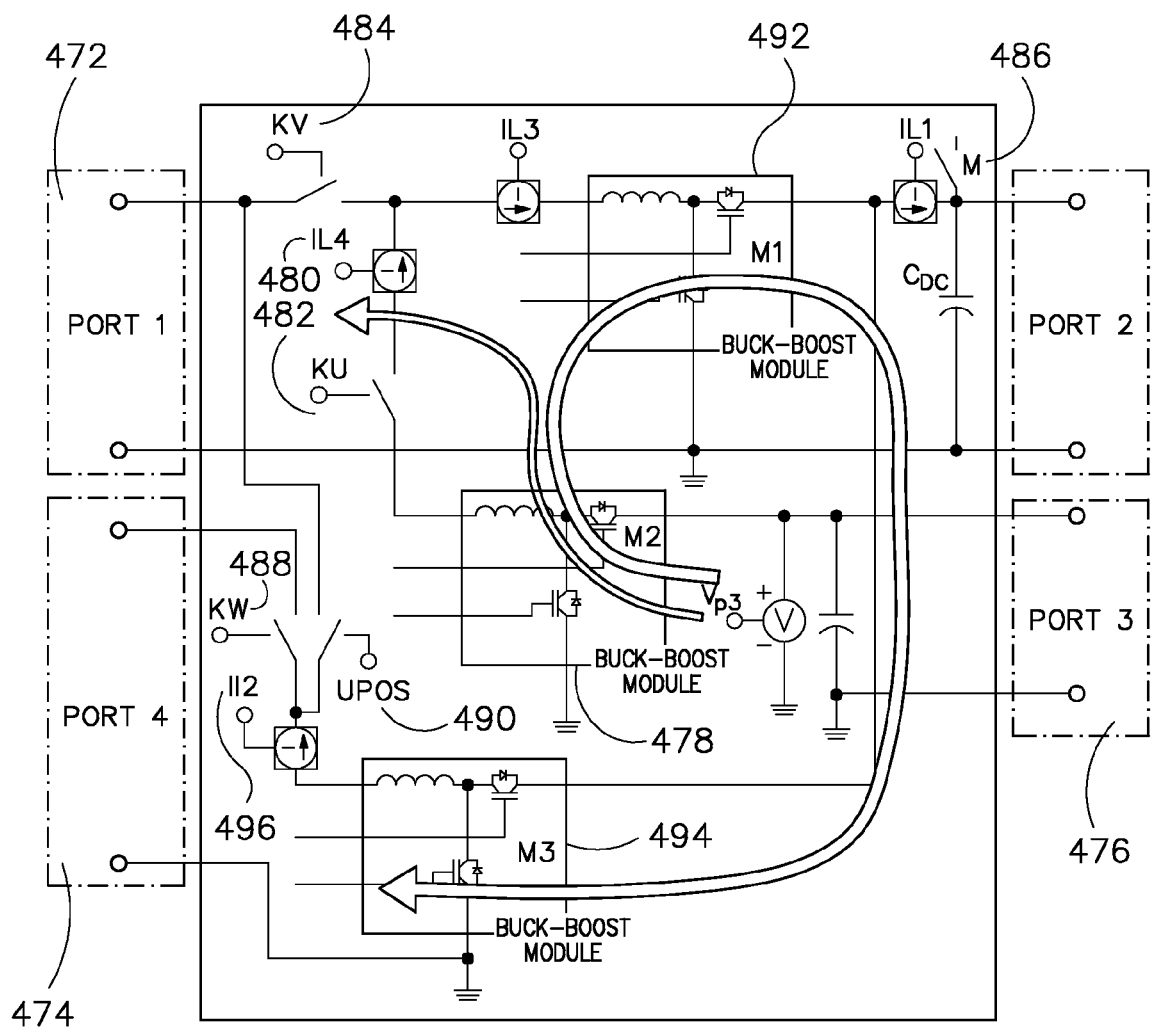
FIG. 16 illustrates energy flow in a multi-port charger according to a configuration of operation.

Referring to FIGS. 15 and 16, energy flow for two configurations of charging is illustrated. Referring first to FIG. 15, energy is to flow from a charger (not illustrated) positioned on port 3 464, to module 2 466, and to module 1 468 operating in boost mode. As such, a DC source may be boosted to a high-voltage output on port 2 470, by ensuring KV and KW are open.

In another example illustrated in FIG. 16, port 1 472 and port 4 474 may be charged simultaneously from a DC source (not shown) coupled to port 3 476. Two cases may be considered regarding FIG. 16, as examples.

Case 1: Input voltage at port 3 476 is higher than battery voltage at port 1 472. In this case module 2 478 operates in buck mode and the current IL4 480 in LU is regulated. Contactors KU 482 and KV 484 are closed, while M 486, KW 488 and UPOS 490 are open.

Case 2: Input voltage at port 3 476 is lower than battery voltage at port 1 472. In this case contactors KU 482, M 486 and UPOS 490 are closed, while KV 484 and KW 488 are open. Module 2 478 is inactive (M2U is permanently on), module 1 492 operates in boost mode to boost the low input voltage up to some higher level. Module 3 494 bucks this voltage back to the set voltage of the energy battery at port 1 472. The current IL2 496 in LW is controlled in a closed loop fashion.

Figure 17:
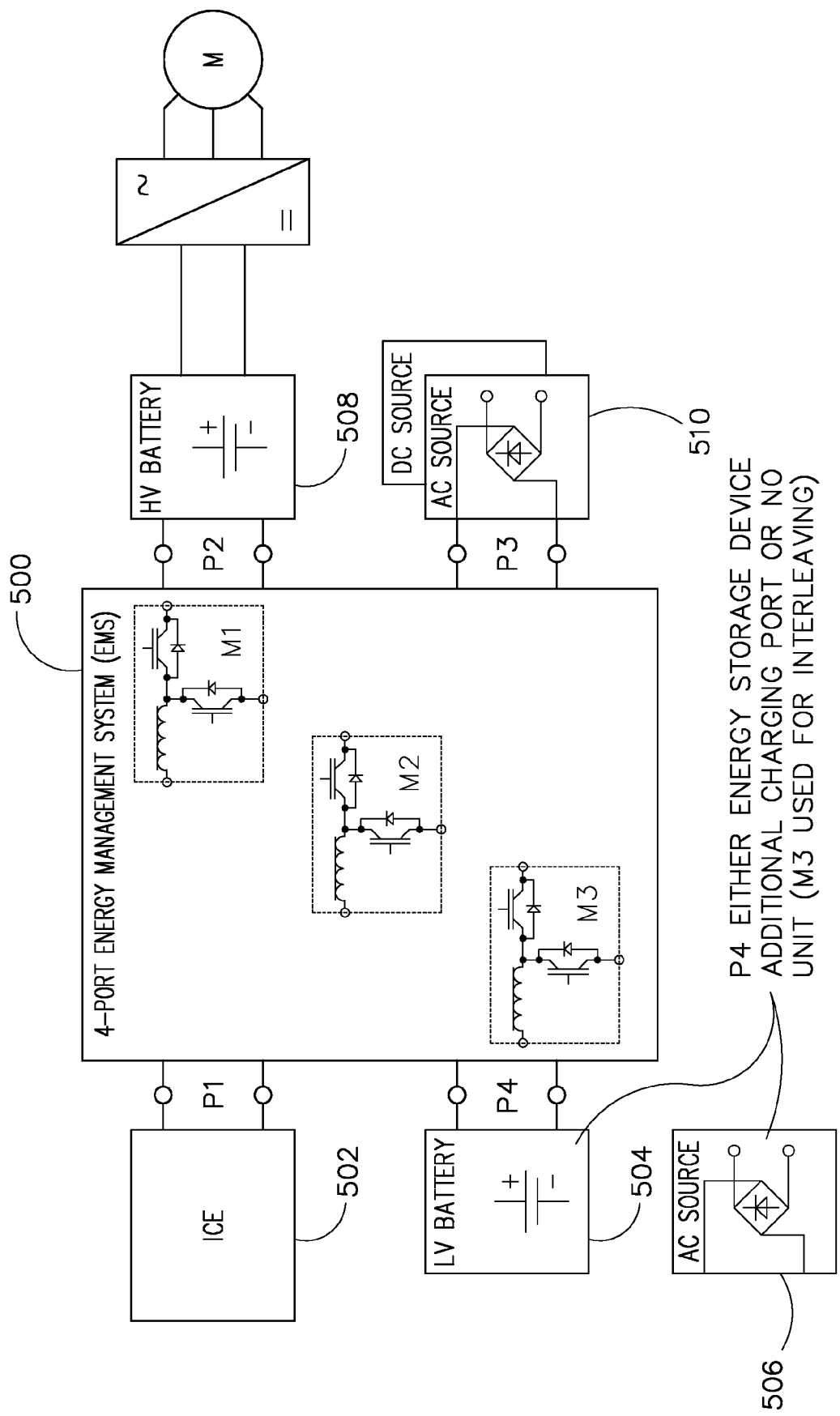
FIG. 17 illustrates a multi-port charger having an energy input from an internal combustion engine (ICE) according to an embodiment of the invention.

In todays commercially available EV and PHEV vehicles, energy and e-motor drivetrains typically include components from different vendors. As a result many units are duplicated, with many single point failure possibilities in the system. Thus, the integration of functions into one instead of three or four management units will result in a reliability improvement, according to embodiments of the invention. From the perspective of a battery manufacturer for example, where good knowledge of the battery cell behavior is available, an integration of ESMS and charger function is desirable. Further, although an EV is specifically mentioned, as mentioned, embodiments of the invention may be used for a PHEV or series hybrid as well. In this case one of the ports on the left could be used to transfer energy from an Auxillary Power Unit (APU), that can operate in charge sustaining mode. In another embodiment, embodiments of the invention could also be used in a true series hybrid configuration, where the ICE APU is large enough to drive the vehicle (series hybrid mode). Thus, referring now to FIG. 17, according to an embodiment, ESMS 500 includes an electrical output from an internal combustion engine (ICE) 502 coupled to port 1, and either a LV battery 506 or a rectified AC source 506 coupled to port 4. For instance, the electrical output from ICE 502 may be an alternator that outputs DC electrical power, in one embodiment. A power battery 508 is coupled to port 2 and an AC source or DC source 510 may be coupled to port 3. As such, an extended vehicle range may be experienced having electrical power derived from ICE 502, thus ESMS 500 provides flexibility for extended vehicle range while providing an ability to charge energy storage system from separate ports.

A technical contribution for the disclosed apparatus is that it provides for a controller implemented technique for charging energy storage devices of an electric vehicle.

According to one embodiment of the invention, an energy storage management system (ESMS) includes one or more energy storage devices coupled to a vehicle drivetrain and configured to store DC energy, a power electronic conversion system having a plurality of energy ports, the power electronic conversion system comprising a plurality of DC electrical converters, each DC electrical converter configured to step up and to step down a DC voltage, wherein each of the plurality of energy ports is coupleable to each of the one or more energy storage devices and each of the plurality of energy ports is coupleable to an electrical charging system. The EV includes a controller configured to determine a voltage of each energy port having either an energy storage device or a DC electrical charging system coupled thereto, and electrically connect a first energy port to a second energy port of at least two of the energy ports such that at least one of the DC electrical converters either steps up or steps down an input DC voltage based on the determined voltage of each energy port.

In accordance with another embodiment of the invention, a method of fabricating an energy storage and management system (ESMS) includes coupling one or more energy storage devices to a vehicle powertrain, fabricating a charging device having a plurality of buck-boost converters, attaching the charging device to the vehicle, the charging device comprising a plurality of energy ports, each of the plurality of energy ports coupleable to each of the one or more energy storage devices, sensing a voltage across each of the plurality of energy ports, determining if an energy storage device and an electrical charging system is coupled to any of the plurality of energy ports based on the sensed voltage, and electrically connecting the electrical charging system to any of the plurality of energy ports having an energy storage device by selectively directing electrical current to flow through one or more of the plurality of buck-boost converters.

In accordance with yet another embodiment of the invention, a non-transitory computer readable storage medium positioned on an energy storage and management system (ESMS) and having stored thereon a computer program comprising instructions which when executed by a computer cause the computer to determine a voltage of each energy port of a multi-port power conversion system that is positioned on the ESMS, and electrically connect at least two of the energy ports such that electrical energy passes from a first of the at least two energy ports to a second of the at least two energy ports and through at least two buck-boost converters, a first buck-boost converter of the at least two buck-boost converters configured to operate in a boost mode, and a second buck-boost converter of the at least two buck-boost converters configured to operate in a buck mode.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An energy storage and management system (ESMS) comprising:
one or more energy storage devices coupled to a vehicle drivetrain and configured to store DC energy;
a power electronic conversion system having a plurality of energy ports, the power electronic conversion system comprising a plurality of DC electrical converters, each DC electrical converter configured to step up and to step down a DC voltage, wherein:
each of the plurality of energy ports is coupleable to each of the one or more energy storage devices; and
each of the plurality of energy ports is coupleable to an electrical charging system; and
a controller configured to:
determine a voltage of each energy port having either an energy storage device or a DC electrical charging system coupled thereto; and
electrically connect a first energy port to a second energy port of at least two of the plurality of energy ports such that at least one of the DC electrical converters either steps up or steps down an input DC voltage based on the determined voltage of each energy port.

2. The ESMS of claim 1 wherein the controller is configured to determine which of the plurality of energy ports has a DC or AC electrical charging system coupled thereto based on an electrical measurement of each energy port.

3. The ESMS of claim 2 wherein the electrical measurement includes at least one of a voltage measurement and a frequency measurement.

4. The ESMS of claim 1 comprising a first energy source coupled to a first port of the plurality of energy ports, and a second energy source coupled to a second port of the plurality of energy ports such that electrical energy is provided to each of the one or more energy storage devices simultaneously from the first energy source and the second energy source.

5. The ESMS of claim 4 wherein the first energy source is a rectified AC source.

6. The ESMS of claim 5 wherein the second energy source is one of a rectified AC source, a rectified DC source, and a DC source.

7. The ESMS of claim 1 wherein the controller is configured to pass electrical energy from the first energy port to the second energy port through a first DC electrical converter of the at least one of the DC electrical converters, the first DC electrical converter configured to step down the input DC voltage.

8. The ESMS of claim 7 wherein the controller is configured to pass the electrical energy simultaneously from the first energy port, through the first DC electrical converter, and to a second DC electrical converter that is configured to step up an input voltage, and to a third energy port.

9. The ESMS of claim 1 wherein at least one of the plurality of DC electrical converters is a buck-boost converter.

10. The ESMS of claim 1 wherein one of the energy storage devices comprises one of an energy battery, a power battery, and an ultracapacitor.

11. The ESMS of claim 1 comprising an electrical output from an internal combustion engine coupled to an energy port of the ESMS.

12. The ESMS of claim 1 comprising an internal combustion engine (ICE) coupled to a transmission, wherein the transmission is coupled to one or more drive wheels of the vehicle drivetrain.

13. The ESMS of claim 1 wherein the controller is configured to:
determine which of the plurality of energy ports has one of the one or more energy storage devices coupled thereto; and
determine which of the plurality of energy ports has an electrical charging system coupled thereto.

14. The ESMS of claim 1 wherein the controller is configured to simultaneously charge two of the one or more energy storage devices by directing energy to go simultaneously to a first energy port and a second energy port of the plurality of energy ports.

15. The ESMS of claim 1 wherein the controller is configured to pass energy through two of the plurality of DC electrical converters such that one of the two DC electrical converters operates to step up a voltage applied thereto, and the other of the two DC electrical converters operates to step down a voltage applied thereto.

16. A method of fabricating an energy storage and management system (ESMS) comprising:
coupling one or more energy storage devices to a vehicle powertrain;
fabricating a charging device having a plurality of buck-boost converters;
attaching the charging device to the vehicle, the charging device comprising a plurality of energy ports, each of the plurality of energy ports coupleable to each of the one or more energy storage devices;
sensing a voltage across each of the plurality of energy ports;
determining if an energy storage device and an electrical charging system is coupled to any of the plurality of energy ports based on the sensed voltage; and
electrically connecting the electrical charging system to any of the plurality of energy ports having an energy storage device by selectively directing electrical current to flow through one or more of the plurality of buck-boost converters.

17. The method of claim 16 wherein the charging device comprises a 3-phase charge connector having more than one input terminal, wherein each terminal of the more than one terminal is configured to have a corresponding power input thereto.

18. The method of claim 16 wherein coupling the one or more energy storage devices comprises coupling at least one of an energy battery, a power battery, and an ultracapacitor.

19. The method of claim 16 wherein coupling the one or more energy storage devices to the vehicle powertrain comprises coupling the one or more energy storage devices to an internal combustion engine.

20. The method of claim 16 wherein electrically connecting the electrical charging system to the any of the plurality of energy ports having the energy storage device comprises connecting the electrical charging system to pass energy through a first buck-boost converter that is operating in a buck mode and to pass the energy through a second buck-boost converter that is operating in a boost mode.

21. The method of claim 16 wherein electrically connecting the electrical charging system to the any of the plurality of energy ports having an energy storage device comprising electrically connecting at least one electrical charging system to at least two energy storage devices.

22. A non-transitory computer readable storage medium positioned on an energy storage and management system (ESMS) and having stored thereon a computer program comprising instructions which when executed by a computer cause the computer to:

determine a voltage of each energy port of a multi-port power conversion system that is positioned on the ESMS; and electrically connect at least two of the energy ports such that electrical energy passes from a first of the at least two energy ports to a second of the at least two energy ports and through at least two buck-boost converters, a first buck-boost converter of the at least two buck-boost converters configured to operate in a boost mode, and a second buck-boost converter of the at least two buck-boost converters configured to operate in a buck mode.

23. The computer readable storage medium of claim 22 wherein the computer causes the electrical energy to pass through a third buck-boost converter that is configured to operate in the buck mode.

24. The computer readable storage medium of claim 22 wherein the computer is caused to determine whether an energy storage device, an electrical charging system, or no device, is attached to each energy port based on the determined voltage.

25. The computer readable storage medium of claim 24 wherein the computer is caused to determine whether the electrical charging system is an AC or a DC source.

26. The computer readable storage medium of claim 24 wherein the energy storage device is at least one of an energy battery, a power battery, and an ultracapacitor.

27. The computer readable storage medium of claim 24 wherein the computer is caused to electrically connect the at least two of the energy ports such that the electrical energy passes from the electrical charging system to the energy storage device.

28. The computer readable storage medium of claim 22 wherein the computer is caused to simultaneously cause the electrical energy that passes through the second buck-boost converter to also pass to a third energy port of the at least two energy ports, the third energy port having an energy storage device attached thereto.

* * * * *